July 6, 1965 R. CHUTE 3,192,998
ROTARY REGENERATOR SEALING STRUCTURE
Filed Dec. 20, 1960 3 Sheets-Sheet 2
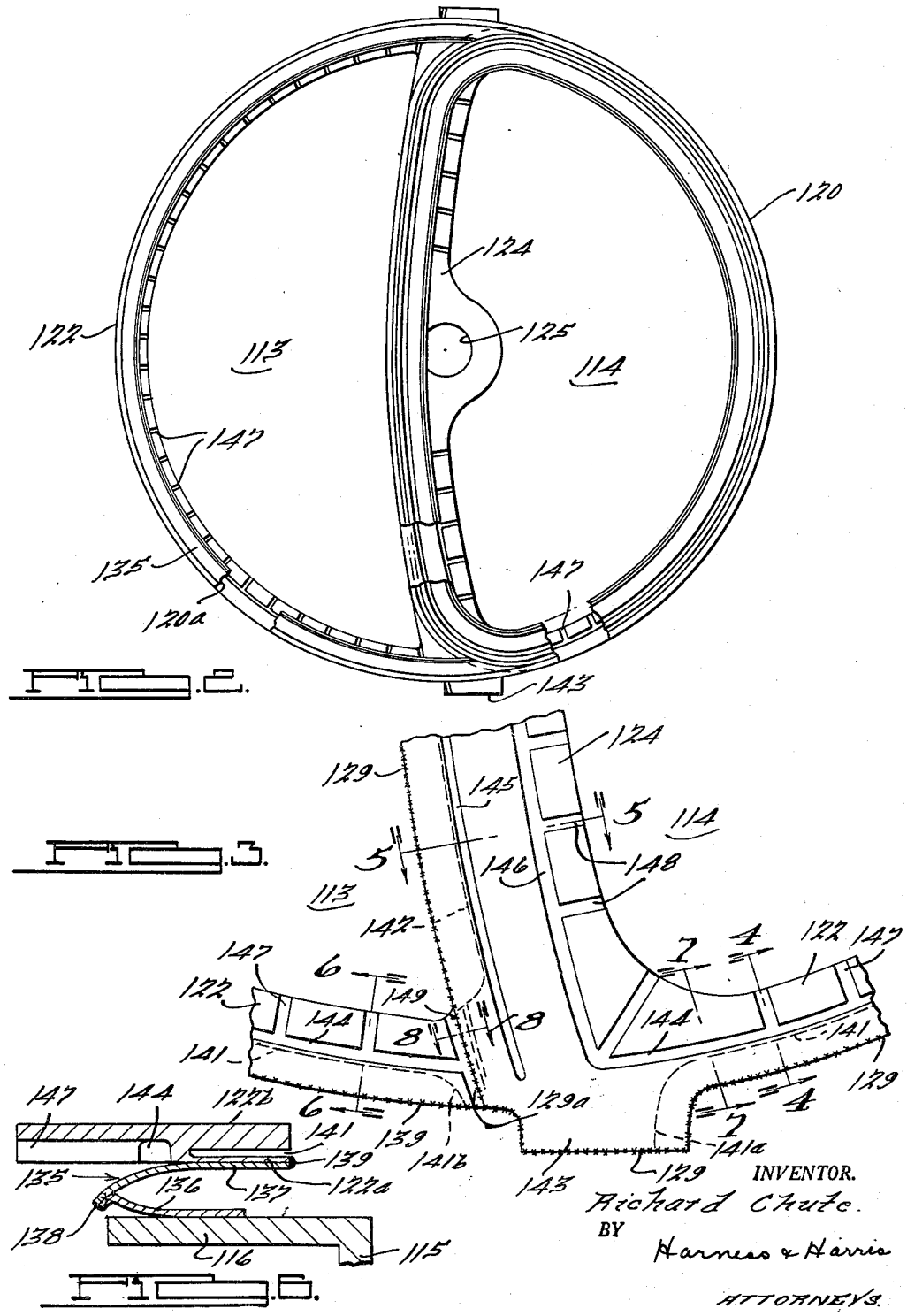
INVENTOR.
Richard Chute.
BY Harness & Harris
ATTORNEYS.

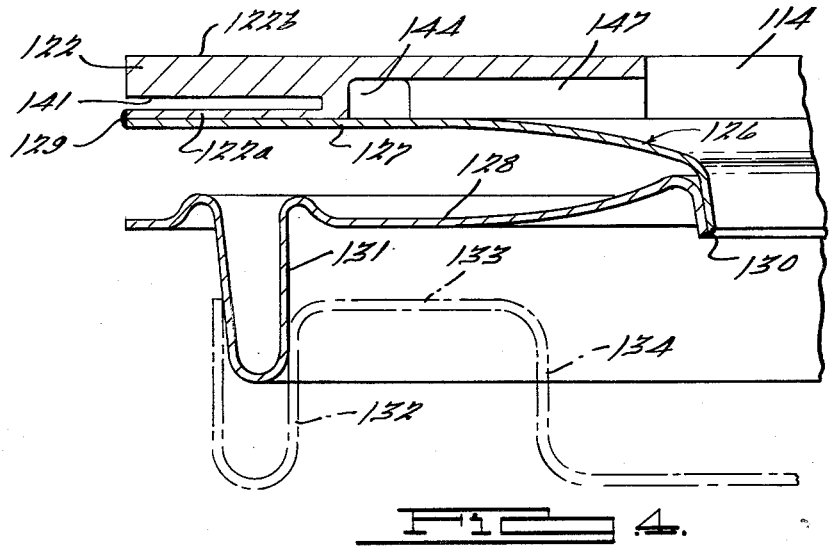
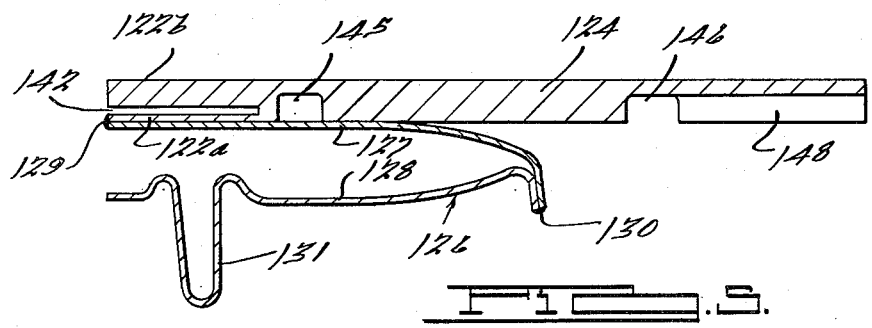
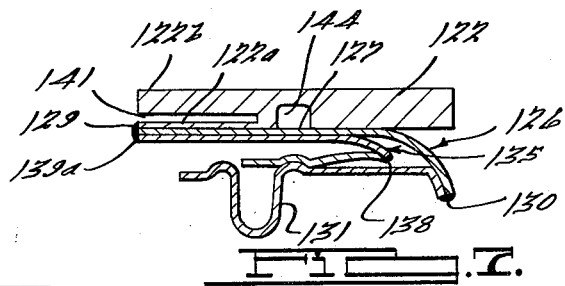
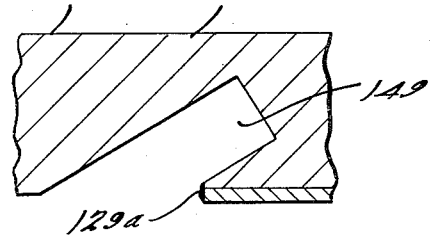

United States Patent Office 3,192,998
Patented July 6, 1965

3,192,998
ROTARY REGENERATOR SEALING STRUCTURE
Richard Chute, Huntington Woods, Mich., assignor to Chrysler Corporation, Highland Park, Mich., a corporation of Delaware
Filed Dec. 20, 1960, Ser. No. 77,126
7 Claims. (Cl. 165—9)

This invention relates generally to gas turbine power plants or other fuel combustion apparatus and to rotary regenerator mechanisms for use therewith. More particularly, the invention is concerned with a new and improved means for sealing rotary regenerator mechanisms to eliminate undesirable bypassing of the gases flowing through separate portions of the regenerator matrix, the gases flowing through one matrix portion being at a different temperature and pressure than the temperature and pressure of the gases flowing through the other portion, and the temperature and pressure of the gases flowing through both portions being different than the temperature and pressure of the gases surrounding the regenerator matrix. This application is a continuation-in-part of copending application Serial No. 55,413, filed September 12, 1960, to which reference may be had for a more complete description of details of structure.

Although the sealing structure of the present invention is capable of being used with a large variety of different fuel combustion apparatus employing a regenerative combustion cycle, one preferred structural environment is disclosed which comprises a compact gas turbine power plant of the automotive type, the regenerator structure therefor including a circular matrix which is rotatably mounted about a central hub portion. The circular regenerator matrix in the disclosed power plant structure is mounted within a cast power plant frame or housing which encloses other component elements of the power plant. These other component elements of the power plant include a rotary compressor which is capable of receiving fuel combustion supporting air through suitable intake air ducts extending to the exterior of the power plant housing. The compressor discharges the intake air at an increased total pressure into a suitable diffuser structure which conducts the comparatively cool and high pressure air to an air intake chamber defined by the upper portion of the cast housing structure, said diffuser effecting a reduction in the velocity pressure of the compressed intake air and an increase in the static pressure.

The regenerator matrix structure may be disposed within the above mentioned intake chamber in adjacent relationship therewith and the compressed intake air may pass through sector-like openings formed in the power plant housing on either side of the regenerator matrix and through a first portion of the regenerator matrix into a passage means communicating with the fuel combustion chamber, the passage of pressurized intake air through said regenerator being confined to said first matrix portion. Also the entire circumference of the regenerator is advantageously bathed in the aforesaid cool and high pressure discharge air entering said air intake chamber from the compressor.

Liquid fuel may be mixed with the air in the fuel combustion chamber and the high temperature gases produced by the fuel combustion process are conducted through suitable baffling to an annular gas passage within which the bladed peripheries of a two-stage turbine wheel assembly are disposed, the turbine wheels associated with the separate turbine stages being disposed in a central portion of the power plant housing. The turbine wheel associated with the first turbine stage is drivably coupled to the rotary compressor unit, above described, and the turbine wheel associated with the second turbine stage is drivably connected to the power input member of a speed reduction transmission, said transmission also being mounted within the power plant housing to form a complete, compact automotive power plant. Each of the turbine wheels is powered by the motive gases passing through the annular gas passage. A suitable drive means may be provided for drivably coupling the first turbine stage with the rotary regenerator matrix to impart a rotary motion to the latter during operation of the power plant.

The high temperature combustion gases are exhausted into a chamber within the power plant housing, said chamber being situated below a second rotary regenerator matrix portion at a location which is displaced from the aforementioned first regenerator matrix portion. Second sector-like openings are formed in the power plant housing on either side of the regenerator matrix and are adapted to accommodate the passage of the hot combustion exhaust gases through said second matrix portion into an exhaust chamber defined by the upper portion of the power plant housing, said exhaust chamber communicating with a suitable exhaust gas outlet passage.

The hot exhaust gases are effective to heat the second regenerator matrix portion to an elevated temperature and as the matrix portion is rotated about its central axis, the heated portion is brought into contact with the relatively cool compressed intake air to effect a transfer of thermal energy from the hot to the cool gases. When the same matrix portion is again brought into contact with the heated exhaust gases upon continued rotation of the regenerator, a transfer of thermal energy again takes place from the exhaust gas to the matrix structure and the temperature of the latter again rises as the cycle is repeated. The regenerator matrix thus serves as a vehicle for transferring thermal energy from the hot combustion exhaust gases to the relatively cool compressed intake air, and the thermal efficiency of the power plant is correspondingly increased.

In consequence of the continual temperature and pressure changes to which the regenerator matrix is subjected, the matrix tends to warp and give rise to difficult sealing problems in the effort to prevent an undesirable and wasteful bypassing or short-circuiting of the gases as they are conducted through the above-described circuit during operation. An object of the present invention is therefore to provide a new and improved regenerator sealing structure which may be disposed between the rotary surfaces of the regenerator matrix structure and the relatively stationary power plant housing within which the regenerator is rotatably mounted, as above described. More specifically, the improved sealing structure includes a comparatively flexible sealing element or sector plate disposed in sliding and sealing engagement with the rotary regenerator matrix structure on either side thereof and a resilient spacer interposed between the sector plate and frame or housing, whereby a resiliently yieldable support is provided for the underside of the regenerator to support the same in a floating relationship, thereby to accommodate for both thermal and pressure induced distortion of the regenerator, as well as to shield the regenerator from mechanical vibration resulting for example from road shock.

Other objects are to provide such a sealing structure which effects a resilient foundation for the sector plate or sealing element that is in sliding contact with the regenerator matrix, and which enables economical installation and ready replacement of the sealing structure.

In one type of regenerator seal, the sector plate is formed from a flat metallic rubbing seal material to provide an annular rim partitioned by means of a generally diametrical cross arm into two sectors for passage of gases axially therethrough. In the course of developing a unit seal assembly using metallic rubbing seals, several problems have been encountered originating from distinctly different sources, although closely associated in their effect on the sealing of the regenerator matrix. One problem results from seal warpage caused by stresses induced during fabrication or welding of the seal. Another problem results from the warpage induced by thermal stresses arising from the environment imposed during operation of the regenerator. As a result, the pressure and spring forces which position the seal or sector plate into contact with the regenerator matrix give rise to an additional complication. These pressure and spring forces attempt to force the sector plate into complete contact with the regenerator matrix. Because of the relative stiffness of the sector plate, the various peaks or high points of the warped sector plate become areas of high unit loading, resulting in excessive leakage, wearing, and driving torque.

Attempts to fabricate a thin flexible seal or sector plate have been unsuccessful for many reasons. A major cause of failure is apparently thermal distortion. In general, thin sector plates tend to have a comparatively large surface area and a comparatively low total heat capacity. Therefore heat transfer to the sector plate in consequence of radiation and convection is large in proportion to the ability of the sector plate to equalize temperature gradients by internal conduction. In consequence, unequal thermal expansion occurs over the area of the sector plate, tending to warp the latter.

Another object of the present invention is to provide an improved rubbing seal sector plate which is suitably slotted or grooved to provide isolation from stress and the flexibility required for seal operation, while retaining a gross thickness sufficient to minimize warping and in addition to provide strength for ease of handling and fabrication. Specifically, an object is to reduce the effect of strain induced by the welded connection between the resilient spacer for the seal and the rim and cross arm of the sector plate. Such strain is reduced by the provision of a generally radially opening groove in the seal rim and cross arm between the region of the weld and the inner surface of the sector plate which confronts the regenerator matrix in sealing engagement. Thus the weld is isolated from the sealing surface of the sector plate, the thickness of the resilient spacer and the axially outer portion of the sector plate to which it is welded can be made compatible, and the welding process is simplified.

Other objects are to provide additional flexibility and to minimize thermal stresses by the provision of a generally axially opening groove in the outer face of the sector plate which confronts the resilient spacer, the latter groove being provided at a location radially inwardly of the first-named groove, thereby also to form a thermal dam between the high temperature and low temperature sides of the seal, and also by the provision of a plurality of generally radially inwardly extending and axially outwardly opening slots or grooves in the outer surface of the sector plate at locations spaced along the length of the seal, so as to preserve the gross or overall thickness of the sector plate, thereby to maintain the necessary heat conductivity therein to prevent localized overheating.

It is a further object of my invention to provide a peripheral sealing structure of the above character which is particularly adapted to be used with a drum-type rotary regenerator for an automotive gas turbine power plant wherein the temperature and pressure differential between the combustion chamber intake and exhaust gas is appreciably high and wherein the periphery of the regenerator matrix is bathed in the comparatively cool and high pressure combustion supporting air discharged from the air compressor. This high pressure air is sealed from the matrix except at a high pressure sector at one axial end of the regenerator and is thus directed axially through the compressor to regions of intermediate pressure where the fuel is added and burned and the combustion products are directed to the turbine rotors to drive the same. The resulting low pressure and comparatively hot exhaust gases are then directed to a low pressure sector of the regenerator at the axial end of the latter opposite the first-named axial end having said high pressure sector. The low pressure sector of the regenerator is sealed from both the aforesaid high and intermediate pressure gases so as to direct the comparatively hot and low pressure gases axially through the low pressure sector of the regenerator to heat the same, whereupon the resulting cool low pressure gases are exhausted to atmosphere.

Further objects are to provide a power plant sealing structure of the type set forth which may be readily and economically fabricated by known production techniques and to provide a peripheral sealing structure for use with a rotary regenerator matrix for an automotive power plant which is characterized by its improved sealing characteristics under all operating conditions of the power plant and by its relatively long operating life.

Other objects of this invention will appear in the following description and appended claims, reference being had to the accompanying drawings forming a part of this specification wherein like reference characters designate corresponding parts in the several views.

FIGURE 2 is a plan view from the underside of the lower sector plate, a portion of the associated regenerator sealing structure being broken away to show details of construction.

FIGURE 3 is a fragmentary enlarged bottom view of a portion of the lower sector plate adjacent the juncture of the cross arm and rim, the associated sealing structure being removed.

Figure 1:
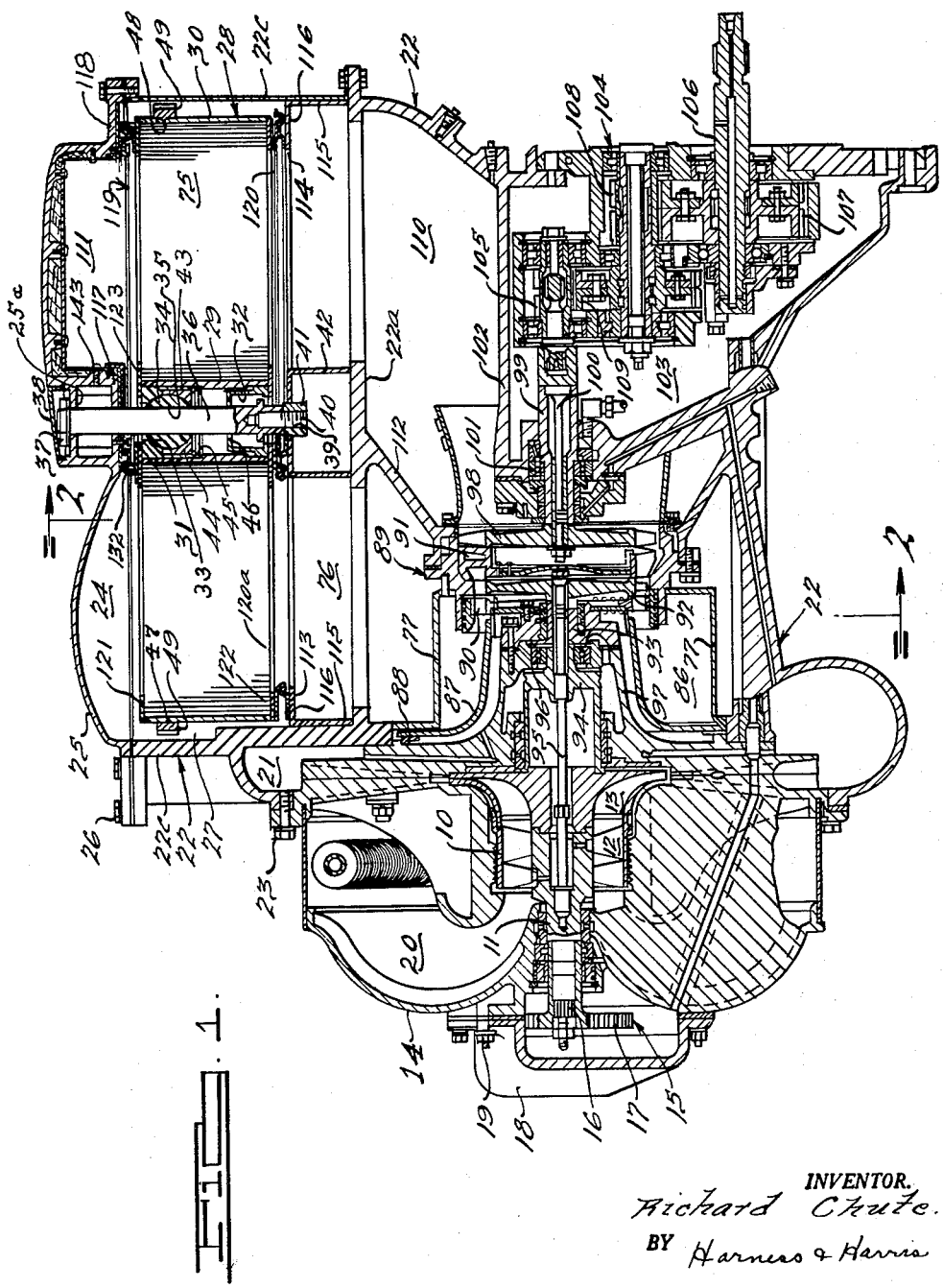
FIGURE 1 is a cross sectional assembly view of an automotive type gas turbine power plant having a rotary regenerator mechanism and incorporating the regenerator sealing structure of my instant invention.

FIGURES 4, 5, 6, 7, and 8 are fragmentary enlarged sectional views taken in the directions of the arrows substantially along the lines 4—4, 5—5, 6—6, 7—7, and 8—8 respectively of FIGURE 3, the sector plate and associated structure being illustrated right side up.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring first to the assembly view of FIGURE 1, an intake air compressor rotor 10 is shown comprising a hub 11 with radially extending inducer blades 12 and working blades 13. The rotor hub 11 includes a leftward extension which is rotatably journalled in an end housing cover 14. Accessory drive gears 15 are drivably connected to the hub extension by means of a splined connection 16 with an accessory drive input gear 17. A suitable cover plate 18 may be provided for enclosing the accessory drive gears 15, said cover plate 18 being bolted to the housing cover 14 by means of bolts 19.

The end housing cover 14 defines an outwardly extending intake air passage 20 having a reverse configuration as shown. The radially inward portion of the passage 20 communicates with the air inducer passage of compressor rotor 10 within which inducer blades 12 are disposed. Upon rotation of the compressor rotor 10 about its central axis, intake air is caused to flow in a generally inward direction through the passage 20 and is then caused to pass in an axial direction through the inducer blades 12. The air is then discharged radially through the blades 13 and is collected in a substantially spiral-shaped diffuser chamber 21, said diffuser chamber 21 being defined by the power plant housing portion 22. It may be observed that the end housing portion 14 is bolted about its outer periphery by means of bolts 23 to the housing portion 22 and is effective to partly define the radially inward portion of the diffuser chamber 21.

The diffuser chamber 21 is substantially spiral in shape and it progresses about the central axis of the rotor 10 with a progressively increasing cross sectional area and termination in a dome-shaped cavity 24 located on the upper portion of the power plant housing assembly, said cavity being defined by an upper housing cover 25 which is bolted at 26 to the housing portion 22 about its outer periphery. The cavity 24 opens directly into an upper cylindrical regenerator containing chamber 27 defined in part by a part 22c of housing 22.

As comparatively cool intake air is discharged into the diffuser chamber 21, its static pressure increases to a maximum value as it collects in cavity 24 and chamber 27. A rotary regenerator 28 in the latter chamber includes a drum-like matrix structure having a circular hub 29 and a rim 30, the hub 29 being reinforced at its upper and lower ends by cylindrical inserts 31 and 32 respectively, having upper and lower surface substantially flush with the upper and lower ends respectively of the hub 29. The insert 31 is firmly secured within hub 29 to comprise a unitary structure therewith and has a thickened upper part formed with a spherical inner surface 33 in bearing engagement with the concentric spherical outer bearing surface of a ball element 34. The latter is provided with an axial bore 35 centered with respect to the outer surface of ball 34 and comprising a cylindrical bearing surface rotatably and axially slidable on a coaxial vertical supporting shaft 36. The shaft 36 extends upward through the ball 34 and regenerator hub 29 and is secured by means of a nut 37 to an upper platform 25a of housing portion 25 and is recessed thereinto and covered by a suitable protective shield 38.

The lower end of shaft 36 projects beyond the lower end of the regenerator hub 29 and is provided with a threaded bore 39 screwed to an upwardly extending stud 40. The latter in turn is secured within a nut 41 welded to the top of an inverted channel-shaped bracket 42 extending generally diametrically below the regenerator 28 and having the lower edges of its depending sides suitably secured to an underlying supporting shelf 22a of the housing portion 22.

Below the spherical surface 33 FIGURE 1, the insert 31 comprises an annular cylindrical extension 43 which receives an annular support 44 held in position by means of a snap ring 45 partially embedded into the lower end of extension 43 immediately below support 44. The latter is also provided with an interior spherical surface concentric with the surface of ball element 34 and cooperating with surface 33 to complete a universal type bearing engagement with the ball element 34. The interior bores of insert 31 and support 44 are appreciably larger than the diameter of shaft 36 to enable freedom of tilting or cocking of the regenerator matrix 28 about all axes perpendicular to the axis of shaft 36.

The lower insert 32 has upright cylindrical walls terminating in an upper inbent annular flange 46 to provide rigidity for the insert 32. The inner circumferential portions of the insert 32 are spaced adequately from shaft 36 so that the regenerator matrix 28 has in effect a freely floating mounting with respect to the shaft 36. The outer spherical surface of ball element 34 and its inner cylindrical surface 35 comprise suitable dry bearing surfaces such as graphite or a metallic oxide to enable both rotational and axial movement of the regenerator matrix 28, as well as the aforesaid tilting or cocking movement with respect to the shaft 36.

The regenerator rim 30 is provided with an annular groove 47 of circular cross section, which tightly receives a mating annular bead 48 integral with the inner periphery of a ring gear 49. The latter extends entirely around the regenerator rim 30 and is spaced slightly therefrom, except at a region of snug contact between the bead 48 and base of the groove 47, to enable the axis of gear 49 to remain vertical regardless of tilting or warping of the regenerator matrix 28 or its supporting structure. Preferably during assembly of the ring gear 49, the latter is expanded by being heated to approximately 700° F. to 800° F. The gear 49 is then passed over the rim 30 until the bead 48 aligns with groove 47. As the gear 49 cools, it shrinks into place with the inner periphery of the bead 48 seating snugly against the base of groove 47 to minimize noise that would otherwise result from free play between the gear 49 and rim 30. The lower edge of gear 49 is suitably keyed to rim 30 by means not shown for rotation therewith as a unit while enabling the adjacent sides of the rim 30 to deform during warping of the regenerator matrix 28 in the manner explained below. The radially outwardly extending teeth of the gear 49 mesh with the teeth of a driving pinion gear of a suitable gear train, not shown, which is operatively connected with the auxiliary gear system 15 for rotation thereby, so that rotation of compressor 10 results in simultaneous rotation of the regenerator matrix 28.

A core or body portion 75 of the regenerator matrix 28 comprises a pervious material having axially extending passages which are effective to conduct gases from one axial side thereof to the other. One typical construction comprises alternate layers of flat sheets and corrugated sheets which are wound about the hub 29 and which define the drum-like core 75. The individual sheets may be formed into an integral assembly by a suitable brazing operation, and the rim 30 may likewise be secured about the periphery of the core by a brazing operation. The alternately spaced corrugated sheets define the above-mentioned axially extending passages through the core body 75.

In accordance with the structure disclosed, the comparatively cool high pressure air entering chamber 24 pervades chamber 27 so as to maintain the ring gear 49 and its driving pinion in a cool temperature environment. In consequence, lubricating of the bearing surfaces for the driving pinion and the teeth thereof intermeshing with gear 49 is facilitated and wearing of the parts is minimized. The compressed intake air passes from chamber 24 in a downward direction through the regenerator core 75 into a chamber 76 disposed in part directly below the regenerator matrix 28, FIGURE 1. By reason of the pressure drop resulting from the flow of high pressure air through the restricted axial passages of the regenerator core, the pressure in chamber 76 will be at an intermediate value, somewhat below the pressure in chambers 24 and 27. Also as will be explained more fully below, air in its downward passage through the regenerator core from chamber 24 to chamber 76 is heated by the regenerator core, and the latter in turn is cooled.

Suitable baffling 77 is provided for conducting the heated air from chamber 76 to a burner cone wherein the air is mixed with liquid fuel. The fuel and air mixture is then ignited and the combustion gases are directed to a spiral-shaped chamber 86 defined in part by the centrally situated baffling 77. The axis of spiral chamber 86 corresponds substantially to the axis of the compressor rotor 10. The chamber 86 is further partially defined by a circular baffle 87 which includes an axially extending portion disposed concentrically about the axis of rotor 10 and having a radially extending portion secured at its outer periphery in fluid sealing relationship at 88 to the housing portion 22. As the gases enter chamber 86, they pass axially through an annular passageway partly defined by a nozzle block assembly designated generally by numeral 89. The nozzle block assembly may be adapted to retain a first ring of stator blades 90 and a second ring of stator blades 91. A first stage turbine wheel 92 is situated within the nozzle block assembly 89 and its peripheral blades are disposed between stator blades 90 and 91 in adjacent relationship therewith. A first spacer element 93 and a second spacer element 94 are interposed between the turbine wheel 92 and the hub 11 of the compressor rotor 10, and a turbine shaft 95 is provided for securing the turbine wheel 92, the spacers 93 and 94 and the rotor hub 11 in axially stacked relationship to form a unitary assembly which may rotate as a unit about a common axis of rotation. A bearing 96 is provided for rotatably journalling the turbine wheel 92 and rotor assembly within a housing extension 97.

A second stage turbine wheel shown at 98 is provided with peripheral blades situated adjacent the stator blades 91 in adjacent relationship therewith. A turbine wheel spacer element 99 is held in axially stacked relationship with turbine wheel 98 by means of turbine shaft 100, and the entire assembly is rotatably journalled by means of bearing 101 in an apertured wall portion 102 of the housing portion 22.

The wall portion 102 is adapted to define an enclosure 103 within which a speed reduction transmission mechanism 104 is disposed, said transmission mechanism comprising an input gear assembly 105 drivably connected to the turbine shaft 100 and a power output shaft 106 situated in a lower portion of the enclosure 103. The power output shaft 106 may be conveniently coupled to a vehicle driveshaft for a conventional automotive vehicle and it is drivably connected at its inner portion to the input gear 105 by intermediate gears 107, 108, and 109.

The combustion gases pass from the chamber 86 through the annular passageway defined by the nozzle block assembly 89 and into an exhaust chamber 110 disposed below the regenerator matrix structure 28. The exhaust gases may then pass from the chamber 110 through the axially extending passages in the regenerator core to heat the latter, then into a dome-like exhaust chamber 111 defined by the power plant housing cover 25. A suitable exhaust conduit may be provided for conducting the exhaust gases from the chamber 111 to an external opening. In passing through the regenerator matrix, the gases are cooled in the process of heating the regenerator core. Also the pressure drop across the latter reduces the pressure of the gases in chamber 111 to slightly above atmospheric pressure.

The low pressure gases in exhaust chamber 110 are separated from the intermediate pressure gases in chamber 76 by wall structure 112 of housing portion 22, said wall structure further providing a means for supporting the aforementioned nozzle block assembly 89 in a central position within the power plant housing portion 22. The regenerator matrix core 75 is exposed to the chamber 76 through a sector-shaped opening identified in FIGURES 1 and 2 as an intermediate pressure area 113. The regenerator matrix core 75 is exposed to the exhaust chamber 110 at an opening designated herein as a low pressure area 114, FIGURES 1 and 2. The openings or areas 113 and 114 are also substantially coextensive with similar sector openings partly defined by platform 22a, integral with wall 112, and channel support 42 which extend radially in opposite directions from shaft 36. The radially outer ends of platform 22a are joined to the vertical cylindrical wall 22c which defines chamber 27. Similarly the radially outer ends of channel support 42 are joined to a cylindrical vertical housing wall 115 secured coaxially to housing portion 22c and having an upper annular horizontal inturned flange 116 flush with the top of support 42. The latter and flange 116 define sector areas generally coextensive with areas 113 and 114 respectively and carry the weight of the regenerator matrix 28 as explained below.

The housing cover 25 is similarly provided with a sector defining portion 117 through which shaft 36 extends. The portion 117 extends radially from shaft 36 in opposite directions coextensively with the top of support 42 and is connected at its radially outer ends with an approximately semi-circular radial flange 118 of housing cover 25. The flange 118 defines the outer semi-circular boundary of a low pressure area above the regenerator matrix 28 and is substantially coextensive with an underlying semi-circular portion of flange 116 which defines the outer semi-circular boundary of an area coextensive with area 114 below the regenerator matrix 28.

In order to support the regenerator matrix 28 and to assure the desired flow of gases therethrough, upper and lower seals 119 and 120 are provided entirely around the area 114 between the upper and lower faces of the drum-like regenerator matrix and juxtaposed portions of the engine housing defined by the peripheral flanges 118 and 116, the sector arm 117 and the top of support 42. A substantially semi-circular seal 120a is provided between the periphery of the lower face of the regenerator matrix 28 and the juxtaposed portion of peripheral flange 116 which bounds the semi-circular periphery of area 113. The latter seal merges with the peripheral portions of seal 120, and in cooperation with the diametrically extending portion of seal 120 overlying the top of support 42, completely encloses the area 113.

The seals 119, 120, and 120a includes upper and lower annular sector plates 121 and 122 having substantially diametrically extending integral cross arms 123 and 124 respectively defining the areas 113 and 114. The central portions of the cross arms 123 and 124 are enlarged to provide hubs containing apertures 125 for coaxial passage of shaft 36 freely therethrough. The sector plates 121 and 122 may comprise thin flexible sheet metal stampings of material such as stainless steel, or may comprise cast or sintered iron. Bonded to the axially inner surfaces of the sector plates 121 and 122 is a suitable rubbing seal material, such as graphite or a suitable metallic oxide adapted to withstand the high temperature of the gases flowing through the regenerator matrix. The inner rubbing seal surfaces lie flush with the upper and lower peripheral surfaces of the regenerator matrix 28 in fluid sealing sliding relationship therewith to prevent radial flow of gases between the juxtaposed surfaces of the regenerator core 75 and the respective sector plate 121 or 122.

The seal 120 also comprises a channel-shaped spacer 126 of resilient sheet material, FIGURES 4, 5, and 7, which extends entirely around the low pressure area 114 and opens radially outwardly from that area. The spacer 126 comprises upper and lower channel sides 127 and 128, the former having its radially outer portion extending flush with the under surface of sector plate 122 and being welded thereto at 129 to effect a fluid tight seam entirely around the periphery of the area 114. The radially inner portion of the channel side 127 extends inwardly toward the area 114 and axially downwardly and is welded at 130 to a parallel flange of the radially inner edge of the channel side 128 to effect a fluid tight seam coextensive with seam 129. Also formed in the channel side 128 is a sealing channel 131 which extends entirely around the area 114 and opens upwardly toward the opposite channel side 127. The channel 131 is dimensioned to fit snugly within a coextensive resilient clamping channel 132 comprising a sheet metal stamping having a flange 133 extending radially inwardly from the mouth of the channel 132. The flange 133 extends in juxtaposition with the channel side 128, then extends downwardly and inwardly at 134 adjacent the top surface of the continuous coplanar surfaces of cross bracket 42 and peripheral flange 116, to which it is secured as for example by being welded thereto at a fluid tight seam entirely around the area 114. Seal 119 is substantially a mirror image of seal 120 and is accordingly not described herein.

Seal 120a comprises a second resilient channel-shaped spacer 135 underlying the entire length of the peripheral portion of sector plate 122 which bounds area 113, FIGURES 2 and 6. The channel spacer 135 opens radially outwardly from the intermediate pressure area 113 and comprises lower and upper channel sides 136 and 137 having juxtaposed downturned inner flanges welded together at 138 along the entire length of the spacer 135. The radially outer portion of channel side 136 lies flush with the underlying portion of housing flange 116 and is under resilient tension yieldingly maintaining itself in fluid sealing relationship with the latter flange. The radially outer edge of the upper channel side 137 is welded at 139 along the entire length of the seal to the underside of plate 122. As illustrated in FIGURE 7, the end portions of the channel spacer 135 extend into the channel spacer 126, both channels 126 and 135 opening in the same direction. At the region of overlap between the channels 126 and 135, the channel side 136 is resiliently urged against the channel side 128 in fluid sealing relationship and the radially outer edge of channel side 137 underlies and is welded at 139a to the interior surface of channel side 127, thereby to provide a leak-proof juncture between the two seals.

In accordance with the foregoing, it is apparent that air entering chamber 24 from compressor 10 is free to circulate entirely around the outer periphery of the regenerator matrix 28 within chamber 27, thereby to bathe the regenerator and its driving mechanism in the comparatively cool high pressure air flow as aforesaid. The upper seal 119 prevents the high pressure air in chambers 24 and 27 from bypassing the regenerator 28 and entering the area 114 or exhaust chamber 111. Likewise the lower seal 120 prevents the high pressure gases in chamber 27 and the intermediate pressure gases in chamber 76 from entering the area 114 except in accordance with the desired flow path from chamber 110. The seal 120a around the outer periphery of sector plate 122, which bounds the intermediate pressure area 113, prevents the high pressure air in chamber 27 from bypassing the regenerator and entering the area 113 or chamber 76 directly from chamber 27.

In consequence, the high pressure air in chamber 24 is directed axially downward through the portion of the regenerator core 75 within the area 113 and into the intermediate pressure chamber 76. This high pressure air is heated in its passage through the regenerator core 75. The exhaust gases from chamber 110 are similarly directed axially upward through the portion of the regenerator core 75, which is bounded by the low pressure area 114 and into the exhaust chamber 111. It is to be noted in the above regard that the comparatively high pressure in chamber 27 enters the open channel mouth of the channel-shaped spacers 126 and 135 so as to assist the inherent resiliency of these channels in supporting the weight of the regenerator matrix 28. Similarly the gases at the intermediate pressure in chamber 76 enter the channel 126 along the extent of the sector cross arm 124 between the ends of channel spacer 135. In this latter regard, the channel spacers 126 and 135 are under resilient tension tending to separate their respective channel sides. Accordingly the regenerator matrix 28 is supported axially in floating relationship by the resiliency of the channel-shaped portions of the bottom sealing structures and the pressure of the air assisting vertical separation of the sides of these channels.

By reason of the pressure differential acting generally diametrically across the regenerator matrix 28 between areas 113 and 114, and further in consequence of the constantly changing temperature distribution in the regenerator core 75, the latter tends to warp upwardly at its peripheral edges with respect to its central axis. This warping is non-uniform around the periphery of the regenerator matrix 28 because of the asymmetric distribution of both the temperature and pressure. The sector plates 121 and 122 are therefore preferably as flexible as possible within the limits required by their structural and sealing characteristics so as to optimize their sealing engagement with the adjacent peripheral surfaces of the regenerator matrix 28.

By suitably slotting and grooving the sector plates 121 and 122, the desired flexibility and thermal isolation is obtained without sacrificing the gross sector plate thickness required for adequate thermal conductivity therein and to facilitate handling of the sector plates and fabrication of the seal assembly. In order to reduce the effect of strain induced by the weld seams 129 and 139, a radially outwardly opening groove 141 is formed in the rim of the sector plate 122 and a similar groove 142 is formed in the cross arm portion 124 so as to open outwardly from the area 114. One portion of groove 141 extends along the entire semi-circular periphery of the area 114 and terminates at opposite ends in outturned portions 141a at the region of diametrically opposed tabs or extensions 143 of the cross arm 124. The tabs 143 are provided for the purpose of attaching moment arms (not shown) to the sector plates for the purpose of bending the latter to a concavo-convex shape as described more fully in said copending application. Another portion of the groove 141 extends along the semi-circular periphery of the area 113 and terminates at opposite ends 141b adjacent the tabs 143. The groove 142 extends substantially the length of the cross arm 124 and terminates adjacent the inner periphery of the rim of sector plate 122.

The grooves 141 and 142 are spaced axially from the outer surface of sector plate 122 so that the thickness of the resulting outer lip 122a and of the resilient arms 127 and 137 are rendered compatible to simplify welding of the seams 129 and 139. In general, the thickness of the lip 122a and of the resilient channel sides 127 and 137 will be approximately the same. The radial depth of the grooves 141 and 142 is determined so as to isolate the stress induced by the welds 129 and 139 from the inner sealing face 122b at the axial inner surface of the sector plate. These welds otherwise tend to constrict the circumference of the sector plates and warp the latter axially outward. Also by isolating the welds from the inner sealing surface 122b, a rigid backing plate for the plates 121 and 122 is not required and the choice of suitable materials from which the sector plates can be fabricated is greatly increased. Similarly the welding process itself is simplified. In a preferred construction used with an approximately 18 inch diameter regenerator 28 for an automobile gas turbine engine, the thickness of the lip 122a and channel sides 127 and 137 is approximately .01 inch. The axial width of the grooves 141 and 142 will vary from .02 to .05 inch, depending upon the materials employed. The radial depth of the grooves 141 and 142 is approximately .40 inch or greater.

Additional flexibility crosswise of the rims and cross arms of the sector plates is obtained by extending the depth of grooves 141 and 142 to within close tolerances of axially outwardly opening grooves 144 and 145 extending within the rim and cross arm respectively of sector plate 122. These grooves in addition to providing lateral flexibility form a heat dam between the high and low temperature sides of the seal to improve the thermal or heat transfer efficiency of the regenerator. In the present instance the width of grooves 144 and 145 is approximately .125 inch. The grooves 144 and 145 extend approximately two-thirds the depth of the sector plate, or to within approximately .03 to .08 inch of the inner sealing surface of the plates 121 and 122. Although the thickness of the latter will vary, depending again on the nature of the material used, cast iron sector plates between .13 and .20 inch thick have been satisfactorily employed. Inasmuch as the cross arm 124 of the sector plate is wider than the rim, a second groove 146 is formed in the cross arm 124 similarly to groove 145 at a location between the latter and the area 114. Groove 146 is spaced from the area 114 the same distance as the portion of groove 144 which extends circumferentially around the latter area. A plurality of circumferentially spaced radial grooves 147 extend from the two portions of groove 144 into the associated areas 113 and 114, these grooves formed in the axially outer surfaces of the sector plates 121 and 122 to the depth of the grooves 144, 145, and 146, thereby to give flexibility to the sector plates along their circumference to enable these plates to conform to non-uniform warping of the regenerator, while preserving sufficient gross thickness for the sector plates to prevent thermally induced crinkling which would otherwise result from uneven localized heating. For a similar purpose, transverse grooves 148 are formed in the cross arm 124 to extend from groove 146 into the area 114, the grooves 148 being cut to the same depth as the grooves 147.

The weld line 129 for the seal between areas 113 and 114 extends continuously along the cross arm and across the rim at 129a as shown, FIGURE 3, and meets the weld line 139 to complete a continuous fluid seal around the area 113. Also from the junctures between the seals 129a and 139, the weld seam 129 extends along the radially outer edges of the tabs 143 and then along the semi-circular outer periphery of the sector rim bounding area 114. An angular slot 149, which serves in the manner of grooves 141 and 142, is cut in the sector plate rim at opposite ends of the cross arm, FIGURES 3 and 8, to isolate this portion of the weld line from the inner sealing surface 122b. Inasmuch as sector plate 121 is grooved similarly to plate 122, this sector plate is not described in detail. The portion of groove 141 along the semi-circular periphery of area 113 is not required for sector plate 121, because no seal comparable to seal 120a is required above the regenerator matrix 75.

In operation of the sealing structure, the grooves 141, 144, and 146, as well as grooves 142 and 145, cooperate with each other and grooves 147 and 148 to minimize undesirable warping of the sector plate 122 and to render the latter free to conform to the juxtaposed axial end surface of the non-uniformly heated and warped regenerator matrix 75. By reason of the inherent yieldability of the sector plate lips 122a resulting from their axial thinness, these comparatively thin cool lips absorb the radially inwardly directed tension caused by the weld seams 129 and 139. Thus the stress of radial shrinking of the lips 122a is absorbed in part by their comparatively long radial dimension and is not imparted to the thicker sealing portion or lips 122b. Also the radially directed stress in the lips 122a is absorbed in part by the fulcrum or strap-hinge effect achieved by the comparatively thin strip of material connecting the lips 122a with the body of sector plate 122 between the channel bases of grooves 141 and 142 and the juxtaposed grooves 144 and 145, FIGURES 4 and 7.

In consequence of the grooves 141 shielding the stress in lips 122a from the sealing lips 122b, both the choice of material to be used for the sector plates is broadened and the selection of a suitable thickness for the lips 122a with respect to the comparatively thin channel sides 127 or 137, to which the lips 122a are welded, is enabled. It is well understood that an approximate 1:1 ratio between the thickness of the thin lips 122a and channel sides 127 or 137 simplifies welding thereof together and enables economies by permitting appreciable latitude in the welding technique to be employed.

Not only does the comparatively large gross thickness of the sector plate 122 enable sufficient heat conduction therein as required to eliminate thermal stresses, but the cooperating sets of grooves 144, 147 and 146, 148 carry hot gases from the region 114, FIGURES 2 and 3, to the mid-regions of the sector plate 122. Thus as illustrated in FIGURE 4, for example, heat from the hottest region 114 is conducted by grooves 147 to grooves 144, so that the region of the sector plate 122 to the right of the base of channel groove 144 is at a substantially uniform temperature and thermal gradients therein at this region are substantially avoided. In consequence the comparatively thick sealing lip 122b is heated more uniformly than would otherwise result, with a consequent reduction in thermally induced warping thereof. This follows because groove 141, FIGURE 4, serves as a heat dam isolating sealing lip 122b from the cooler lip 122a which is cooled by conduction to spacer 126 in the comparatively cool high pressure air of chamber 27. The heat dam effect could be enhanced by filling grooves 141 with an insulating material such as asbestos. However the dead air space in grooves 141 will serve as an adequate economical insulation.

In the above regard, groove 144 also serves as a heat dam, such that the comparatively thin strip of sector plate material between groove 144 and the base of groove 141, FIGURE 4 for example, serves as the sole path for conduction of heat within the material of sector plate 122 to the cooler radially outer lip 122a. Accordingly, the resulting temperature gradient in lip 122a will be increased, but as aforesaid, stress in the lip 122a is mechanically separated from the lip 122b so as to minimize impairment of the latter's sealing effectiveness.

I claim:

1. In combination, a rotary regenerator for a gas turbine engine, means for mounting said regenerator for rotation about an axis, said regenerator having a matrix and axially opposed end surfaces adapted to conduct separate streams of gases axially therethrough, means for effecting a seal between said gases including a sector plate having an inner sealing surface engaging one of said end surfaces in sliding sealing relationship and having an opposite outer surface, said sector plate also comprising an annular rim and a cross arm partitioning the area bounded by said rim into two sectors for axial passage of said separate streams of gases therethrough respectively, a spacer having a continuous portion extending entirely around the area of one of said sectors and being welded to said outer surface of said sector plate at a continuous seam extending entirely around the latter area, said continuous seam extending the length of said cross arm along an edge thereof, said edge being proximate the other of said sectors, said continuous seam also extending across said rim to adjacent the outer periphery of said rim, and thence along the radially outer peripheral edge of said rim around said latter area, and means for isolating said sealing surface from the stress induced by said seam comprising a channel-shaped slot extending in said arm and rim lengthwise of said seam at a location between said seam and inner surface and opening edgewise of said edges, one of the channel sides of said channel-shaped slot being comparatively flexible and containing said outer surface and seam, the sides of said slot being generally transverse to said axis.

2. In combination, a rotary regenerator for a gas turbine engine, means for mounting said regenerator for rotation about a central axis, said regenerator having a matrix and axially opposed end surfaces adapted to conduct separate streams of gases axially therethrough, means for effecting a seal between said gases including a sector plate having an inner sealing surface engaging one of said end surfaces in sliding sealing relationship and having an opposite outer surface, said sector plate also comprising an annular rim around said axis and a cross arm partitioning the area bounded by said rim into two sectors for axial passage of said gases therethrough, a spacer having a continuous portion extending entirely around the area of one of said sectors and being welded to said outer surface of said sector plate at a continuous seam extending entirely around the latter area, said continuous seam extending the length of said cross arm along the edge thereof proximate the other of said sectors, thence across said rim to adjacent the outer periphery of said rim, and thence along the radially outer peripheral edge of the portion of said rim which bounds said latter area, and means for isolating said sealing surface from the stress induced by said seam comprising a channel-shaped slot extending in said arm and rim lengthwise of said seam at a location between said seam and inner surface and opening edgewise of said edges, the sides of said channel-shaped slot extending transversely of said axis, one of the channel sides of said channel-shaped slot being comparatively thin and flexible and containing said outer surface and seam, the last-named means also including a groove extending lengthwise of said seam adjacent the channel base of said channel-shaped slot at a location between said base and the associated edges of said cross arm and rim proximate said latter area, said groove opening outwardly of said outer surface and extending into said sector plate toward said inner surface beyond the base of said slot to effect a heat dam between the opposite edges of the portions of said sector plate bounding said latter area.

3. In combination, a rotary regenerator for a gas turbine engine, said regenerator having a matrix and a rotating surface adapted for passage of separate streams of gases therethrough, means for effecting a seal between said gases including a sector plate having an inner sealing surface engaging said regenerator surface in sliding sealing relationship and having an opposite outer surface, said sector plate also comprising an annular rim and a cross arm partitioning the area bounded by said rim into two sectors for passage of said separate streams of gases therethrough respectively, a spacer having a continuous portion extending entirely around the area of one of said sectors and being welded to said outer surface of said sector plate at a continuous seam extending entirely around the latter area, and means for isolating said sealing surface from the stress induced by said seam comprising a channel-shaped slot extending in said arm and rim lengthwise of said seam at a location between said seam and inner surface and opening edgewise of the associated edges of said arm and rim remote from said latter area, one of the channel sides of said channel-shaped slot being comparatively thin and flexible and containing said outer surface and seam, the sides of said slot extending in parallelism with the adjacent portions of said regenerator surface.

4. In combination, a rotary regenerator for a gas turbine engine, said regenerator having a matrix and a rotating surface adapted for passage of separate streams of gases therethrough, means for effecting a seal between said gases including a sealing element having an inner sealing surface engaging said rotating surface of said regenerator in sliding sealing relationship adjacent a boundary of said gas flow and having an opposite outer surface, a spacer welded to said sealing element at a continuous seam extending along said seal, and means for isolating said sealing surface from the stress induced by said seam comprising a channel-shaped slot extending in said sealing element lengthwise of said seam at a location between said seam and inner surface, one of the channel sides of said channel-shaped slot being comparatively thin and flexible and containing said outer surface and seam, the sides of said slot extending generally in parallelism with the adjacent portions of said rotating regenerator surface.

5. In a gas turbine engine, a rotatable regenerator having a matrix and a rotating surface adapted for passage of gases therethrough, a sector plate having an outer surface and also having an opposite inner sealing surface engaging said rotating surface of said regenerator in sliding sealing relationship to partition the area of said rotating surface into two parts for passage of gases therethrough, separate gas passage means in communication with the two parts respectively of said area for conductiing said gases thereto, at least one of said gas passage means being welded to said sector plate at a continuous fluid sealing seam comprising a boundary between said parts of said area, and means for isolating said inner sealing surface from stress induced by said seam and also for enhancing the flexibility of said sector plate without sacrificing comparatively large gross thickness thereof between said inner and outer surfaces, said last named means including a channel-shaped slot extending into an edge of said sector plate spacing said inner and outer surfaces and also extending lengthwise of said seam and spacing the latter from said inner surface and opening into one of the parts of said area, one of the channel sides of said channel-shaped slot being comparatively thin and flexible and containing said outer surface and seam, the channel sides of said slot extending in parallelism with the adjacent portions of said rotating surface, a groove extending linearly in said sector plate at a region between the channel base of said slot and the other of said two parts of said area, and a plurality of transverse grooves extending from said first named groove into said other of said two parts of said area, all of said grooves opening outwardly from said outer surface and extendiing into said sector plate toward said inner surface for the major portion of said thickness of said sector plate.

6. In a gas turbine engine, a housing, a regenerator having a matrix and an axial end surface adapted for axial passage of gases therethrough and rotatably mounted in said housing, a sector plate comprising a boundary for an area at said axial end surface of said regenerator, said sector plate having an inner sealing surface engaging said end surface in sliding sealing relationship and also having an opposite outer surface, gas passage means in said housing for conducting gases to said area, a flexible spacer welded to said outer surface of said sector plate at a continuous seam extending along said boundary, said spacer also engaging said housing to comprise a baffle cooperable with said passage means for directing said gases to said area, and means for isolating said sealing surface from the stress induced by said seam comprising a channel-shaped slot extending in said sealing plate lengthwise of said seam and spacing the latter from said inner surface, said slot being adjacent and generally parallel to said outer surface, one of the channel sides of said channel-shaped slot being comparatively thin and flexible and containing said outer surface and seam.

7. In combination, a rotary regenerator for a gas turbine engine having a matrix and a rotating surface adapted for passage of gases therethrough, means for conducting said gases to said rotating surface of said regenerator for passage through the latter including a sector plate having an inner sealing surface in sliding sealing relationship with said rotating surface and having an opposite outer surface, said means also including a spacer welded to said sector plate at a continuous seam extending along a boundary of said gases, and means for isolating said sealing surface from the stress induced by said seam comprising a channel-shaped slot extending in said sector plate lengthwise of said seam and spacing the latter from said inner surface, one of the channel sides of said channel-shaped slot being comparatively flexible and containing said outer surface and seam and being also generally parallel to the adjacent portion of said rotating surface, the last named means also including a groove extending lengthwise of said seam adjacent the channel base of said channel-shaped slot and opening outwardly of said outer surface, said groove extending into said sector plate toward said inner surface beyond said base to effect a heat dam between said base and the portioins of said sector plate spaced from said base by said groove.

References Cited by the Examiner

UNITED STATES PATENTS

| 2,807,445 | 9/57 | Gardner | 165—173 |
| 2,880,972 | 4/59 | Williams | 165—269 |
| 2,969,644 | 1/61 | Williams et al. | 60—39.51 |
| 3,078,551 | 2/63 | Patriarca et al. | 29—483 |

FOREIGN PATENTS

| 768,854 | 2/57 | Great Britain. |
| 814,254 | 6/59 | Great Britain. |

CHARLES SUKALO, *Primary Examiner.*

HERBERT L. MARTIN, *Examiner.*